May 14, 1940. F. J. CIRVES 2,200,468
RECOVERY OF BY-PRODUCTS FROM BLACK LIQUOR
Filed Aug. 8, 1938 2 Sheets-Sheet 2
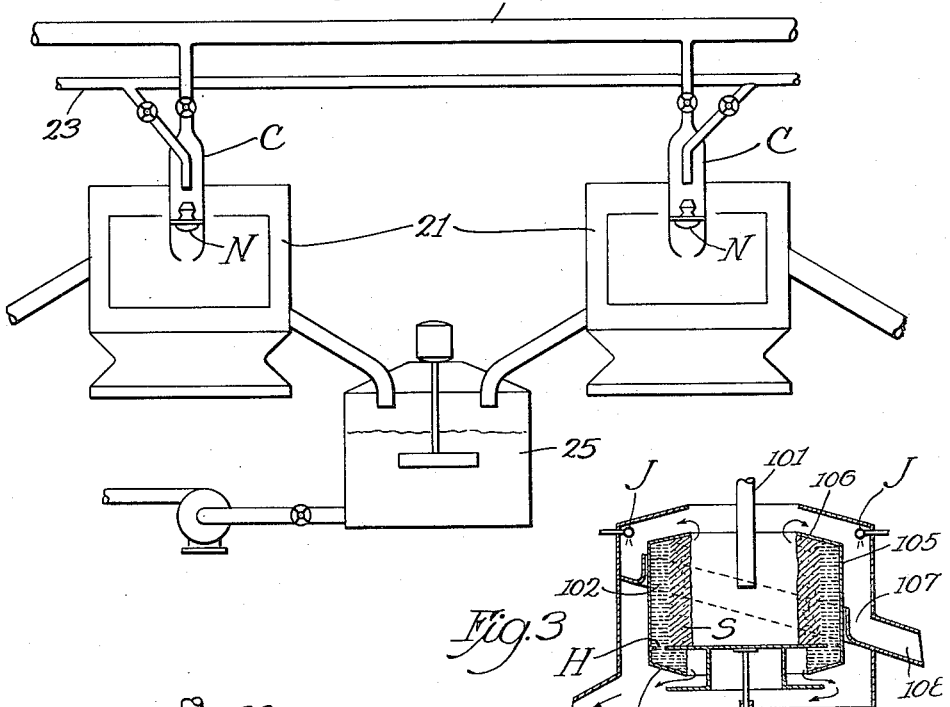
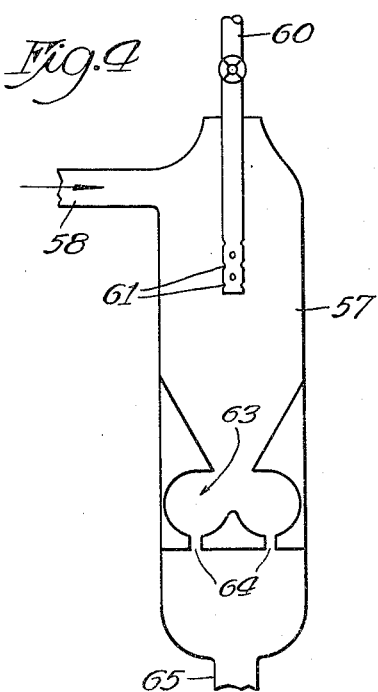
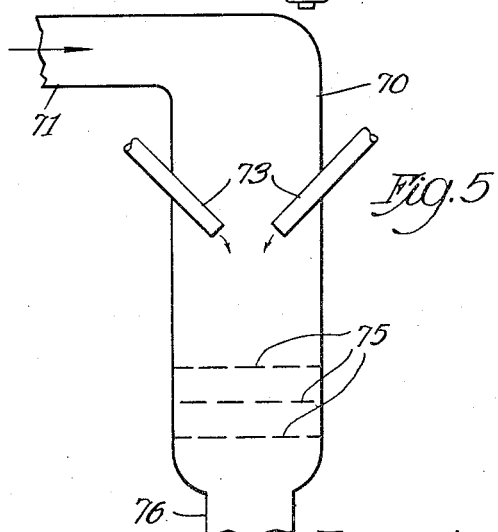
Inventor
Francis J. Cirves
By Frank W. Marks, Atty.

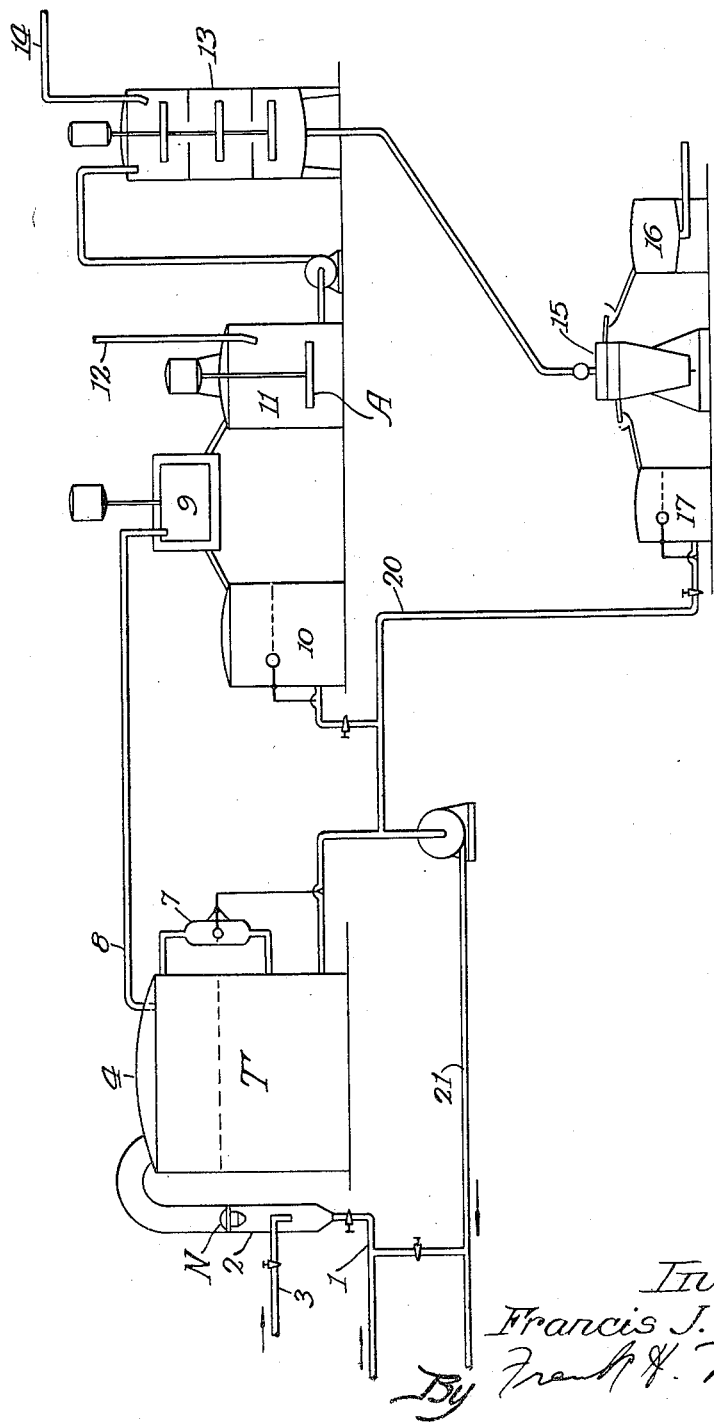

Patented May 14, 1940

2,200,468

UNITED STATES PATENT OFFICE 2,200,468

RECOVERY OF BY-PRODUCTS FROM BLACK LIQUOR

Francis J. Cirves, Crossett, Ark.

Application August 8, 1938, Serial No. 223,559

9 Claims. (Cl. 260—97.5)

My invention relates to the recovery of by-products from the black liquor derived from the digestion of coniferous and resinous woods for pulp. In the digestion of pulp wood in the sulphate or kraft cooking process, or in the soda process, the residual liquor has a high resin soap content due to the saponification by the alkaline digestion liquor of resinous materials extracted from the wood. These materials are ordinarily lost in the recovery of the digesting materials from the black liquor and although methods have heretofore been suggested for their recovery, so far as I am aware, no method has yet been proposed which is sufficiently practical.

An object of my invention is to provide an improved process for the recovery from the residual liquors from the treatment of wood pulp of resinous and fatty materials present in such liquors.

A further object of my invention is to provide such a method which is economical and efficient in operation, which requires a minimum of special equipment, which is simple and substantially automatic in operation, and which is entirely satisfactory for the purposes desired.

Another object is to provide apparatus for effectively performing my improved method.

My invention contemplates the agitation of black liquor in a continuous stream in the presence of air so as to remove from solution the soaps which are dispersed throughout the black liquor, to a state of finely divided yellow flakes which are floated on the liquor surface. These flakes are particles consisting of a physical mixture or emulsion of air and the soap fats. A continuation of this process causes a massive body of suds to form which readily floats upon the liquor which may be entirely freed from any entrained liquor and excess air, as by centrifuging. The solid residue from the centrifugal operation consists of soaps, which are diluted with water and steam to the desired consistency and temperature, and thence treated with acid to convert the soaps into tall oil. Tall oil, as is well known, consists essentially of mixed fatty acids of oleic and linoleic series and rosin acids together with a small proportion of non-acid substances.

Although crude soaps of tall oil may be recovered from black liquor by cooling and permitting the soaps to collect upon the surface as a scum and also increased to some extent by blowing air through the liquor in a tank, such a method is not economically practical in a modern paper mill for the reason that the amount of soap separated is so small in comparison with the large amount of liquor storage facilities required that the huge liquor output cannot be handled, it being well known that one ton of pulp normally results in about 2,000 gallons of black liquor.

In accordance with my invention, therefore, the liquor is treated in a continuous stream by the powerful action of an air mixing nozzle, thus demulsifying the soaps in the liquor and liberating the aerated soap fat particles. In this manner I am able to handle a large liquor output in a relatively small space and with a minimum of equipment.

My invention will be best understood by reference to the accompanying drawings illustrating certain preferred embodiments of my invention, wherein:

Fig. 1 is a diagram showing a preferred form of a system embodying my invention;

Fig. 2 is a similar view showing a portion of a modified arrangement;

Fig. 3 is a diagrammatic sectional view of a basket centrifuge which has been especially designed by me to operate continuously in separating the clean soap; and Figs. 4 and 5 are diagrammatic sectional views of devices embodying modified forms of my invention for treating black liquor.

Referring to Fig. 1, black liquor enters conduit 1 from the storage tanks or from the evaporators of a pulp mill and passes into an air chamber 2. The liquor which is fed into my recovery system may be at any temperature so long as the liquor remains sufficiently fluid and may be between 50° and 250° F. and is preferably below excess steaming, that is, not above about 150° F. The liquor may also be of any specific gravity although the best yields are obtained from liquor having a specific gravity of about 1.1 to 1.2 as obtained from the first to the third effect of a four or five effect evaporator system. Into the liquor in chamber 2 air is injected from a pipe 3 and passes through a mixing nozzle N of any suitable type. Nozzles of various designs may be used, but I prefer a type such as is used in petroleum refining for mixing the crude oil with acid, etc. The air is injected at a pressure which should be in excess of the liquor pump pressure, which may vary up to about 30 pounds. I preferably inject air at a pressure of 50 to 100 pounds per square inch.

After passing through the churning effects of the mixing nozzle N the liquor falls to form the lower layer in a tank T, leaving the suds afloat thereon. As the pressure within the tank is built up, the suds are carried through a discharge pipe 8 to centrifuge 9. The centrifugal force, being many hundred times gravity, instantly draws away any entrained liquor and also releases considerable air to form a congealed mass of soap. The yellow mass of soap leaving the centrifuge has been found to consist of air, water and soap in approximately equal volumes with a specific gravity of about 0.75. The liquor removed by the centrifuge passes to a discharge tank 10 from which it is continuously pumped away to a return conduit 21.

The soap is discharged from the centrifuge into a dilution tank 11 into which is introduced through pipe 12 a sufficient amount of water and steam to prepare it for the subsequent acid treatment, say about 0.5 pound of water per pound of soap, raising the latter to a temperature of about 180° F. The material is mixed in tank 11 by a suitable agitator A. The soap stock then passes to a tank 13, into which sulphuric acid solution of a specific gravity of about 1.4 enters by way of conduit 14, a continuous proportionating line.

The water oil emulsion is discharged by gravity into one or more oil centrifuges 15 which continuously separate the tall oil from the spent acid solution, the two liquids passing into tanks 16 and 17, respectively. The spent, weak acid is a solution of $Na_2SO_4$ or salt cake which passes through conduit 20 to the black liquor line and is returned to the black liquor recovery system or evaporators. The salt cake is a necessary material for replenishing the $Na_2S$ content in the sulphate cooking process and hence the spent acid solution becomes of good use, being quickly neutralized and dispersed in the large excess of black liquor. Before going to the centrifuges 15, the emulsion may be heated to a temperature that at which the emulsion breaks, say about 212° F., thus thinning the oil and facilitating its separation.

The crude oil from tank 16 is pumped into a storage tank or may be sent directly into a refining system of any suitable type. The refining unit may be a high vacuum steam still to fractionate the lighter and more volatile oils, fats, and resins from the darker colored bodies, sediment and impurities, the yield being 80–90%.

Liquid level controls 7 are employed at various points, as shown.

Fig. 2 shows a portion of a modified system embodying my invention. According to this arrangement, which eliminates the need for a separating tank, I use a plurality of soap centrifuges, air jets and mixing nozzles. Air from line 23 is injected into the liquor from line 24 in the chambers C, the material passing through a mixing nozzle N and discharging directly into centrifuges 21. The centrifuges immediately separate the liquor and air from the emulsified soaps. The soap masses flow to the common receptacle 25 which may be used to dilute the soap with water and steam and also for acid treatment in preparation for subsequent oil centrifuging as before.

Fig. 3 is a sectional diagram of the basket soap centrifuge especially designed to operate continuously in connection with my invention. The liquor and soaps pass into the centrifuge through pipe 101. The heavier liquor is thrown against the sides at 102 and passes out through peripheral holes H on the bottom and down over the curb 103 and out the discharge pipe 104. The lighter soaps spin as an inner layer S in the basket 105 and as the quantity increases it is thrown over the curb 106 against the outer casing and flows with the assistance of water jets J on the incline 107 and out through the discharge pipe 108.

Various other arrangements coming under my invention may be used for demulsifying the black liquor. Thus, in Fig. 4 the liquor is introduced into a chamber 57 through a conduit 58 while air is injected through a pipe 60 provided with a plurality of apertures 61. In this case the apertures may be about one-eighth inch in diameter while the liquor line is, say, about four inches in diameter. The liquor into which the air has been injected passes down to a "vortex" 63 consisting of surfaces which are arranged in approximately the form of an annulus or "doughnut," tending to churn the liquor violently in the presence of the air, after which it is discharged through a plurality of openings 64 in the bottom of the annulus and finally is discharged from the chamber 57 at a bottom opening 65.

Still another arrangement for practicing my invention is shown in Fig. 5, consisting of a cylindrical vessel 70 into which black liquor is introduced through a conduit 71. Within the vessel is a plurality of pipes 73 for injecting air into the liquor, after which it passes through a plurality of spaced baffle plates 75 having staggered apertures therein, whereby the liquor is violently churned with the air. The liquor finally leaves the vessel as at 76.

At any stage of the soap separating process, e. g., at the air-injecting stage or at the centrifuging stage, the separation may be facilitated, if desired, by injecting in the form of a spray an oily material in which the soap may be partially miscible, such as kerosene, benzol, carbon tetrachloride, turpentine, active or inactive, etc. However, this is not required.

Papermill liquors other than from the sulphate and the soda process may be employed, such as the acid liquors of the sulphite process. Any liquors having fatty or resinous constituents may be treated in the manner disclosed with or without prior or simultaneous neutralization.

Numerous other arrangements coming within the spirit of my invention will doubtless occur to those skilled in the art, and hence I do not intend to be restricted to the specific embodiments herein shown and described, but intend that the scope of my invention shall be limited only by the appended claims, which are to be interpreted as broadly as the state of the art will permit.

I claim:

1. A method of treating black liquor from the digestion of woodpulp, comprising injecting air into a stream of said liquor so as to demulsify the soap present in the liquor, and separating said demulsified soap from the liquor.

2. A method of treating black liquor from the digestion of wood pulp, comprising agitating the liquor in a continuous stream by injecting therein a current of air, so as to demulsify the soap present in the liquor, and separating said demulsified soap from the liquor.

3. A process of treating black liquor from the digestion of wood pulp, comprising injecting into a restricted stream of said liquor a current of air so as to demulsify the soap present in the liquor, separating said demulsified soap from the liquor, and hydrolyzing said soap to produce tall oil.

4. A process of treating black liquor from the digestion of wood pulp, comprising conveying the liquor in a continuous stream, injecting into said stream a jet of air, churning the air and liquor together to ensure intimate contact therebetween, whereby the soap present in the liquor is demulsified, and separating the soap from the liquor by means of the difference in specific gravity between said materials.

5. A process of treating black liquor from the digestion of wood pulp, comprising intimately introducing air into a stream of black liquor with agitation so as to agglomerate the soapy particles, separating by gravity the soap from the aqueous material, centrifuging the soap, and hydrolyzing it to form tall oil.

6. A process of treating black liquor, comprising conveying a stream of black liquor from the evaporators at an optimum specific gravity of about 1.1–1.2 and temperature of about 150°–250° F., injecting an air jet into said liquor stream with churning so as to agitate and aerate said liquor, and separating from the liquor the solid soapy constituents which have been concentrated from the liquor by said treatment.

7. A continuous process of treating black liquor, comprising means for conveying a stream of black liquor from the evaporators at an optimum condition of 1.1 to 1.2 specific gravity and about 150°–250° F. temperature, injecting air into the stream of said liquor in such a manner as to agitate and aerate said liquor thus concentrating the soapy constituents, centrifugally separating the solid soapy material from any entrained liquor, diluting, heating, and acidifying the soapy material, and centrifugally separating the tall oil from the spent aqueous phase.

8. A continuous process of treating black liquor from the digestion of wood, comprising introducing air into a stream of black liquor in such a manner so as effectively to aerate and agitate said liquor, thus concentrating the soapy constituents, and continuously separating the solid air-emulsified soapy material from its entrained liquor.

9. A process of treating black liquor from the digestion of wood pulp, comprising conveying the black liquor in a continuous stream, introducing air into said stream, intimately commingling the air and liquor with agitation so as to cause the soapy constitutents of the liquor to agglomerate, and separating the soap from the aqueous constituents by means of the difference in specific gravity of said materials.

FRANCIS J. CIRVES.